United States Patent
Long et al.

(10) Patent No.: US 8,325,681 B2
(45) Date of Patent: Dec. 4, 2012

(54) CALL TRANSFER METHOD, SYSTEM AND DEVICE

(75) Inventors: Shuiping Long, Shenzhen (CN); Hui Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 12/766,692

(22) Filed: Apr. 23, 2010

(65) Prior Publication Data

US 2010/0216445 A1 Aug. 26, 2010

Related U.S. Application Data

(63) Continuation of application No. PCT/CN2008/072704, filed on Oct. 15, 2008.

(30) Foreign Application Priority Data

Oct. 25, 2007 (CN) .......................... 2007 1 0165401

(51) Int. Cl.
*H04W 4/00* (2009.01)
(52) U.S. Cl. ....................................... 370/331; 370/352
(58) Field of Classification Search .................. None
See application file for complete search history.

(56) References Cited

U.S. PATENT DOCUMENTS

| | | | |
|---|---|---|---|
| 5,867,784 A | 2/1999 | Lantto | |
| 5,920,812 A | 7/1999 | Palviainen | |
| 6,519,454 B1 | 2/2003 | Calabrese et al. | |
| 6,925,082 B2 * | 8/2005 | Buhrke et al. | 370/393 |
| 7,068,598 B1 * | 6/2006 | Bryson et al. | 370/230 |
| 8,180,338 B1 * | 5/2012 | Sylvain | 455/422.1 |
| 8,218,528 B2 * | 7/2012 | Cai | 370/352 |
| 8,243,715 B2 * | 8/2012 | Itzkovitz et al. | 370/352 |
| 2002/0169883 A1 | 11/2002 | Bright et al. | |
| 2004/0184435 A1 * | 9/2004 | Westman | 370/349 |
| 2004/0190498 A1 * | 9/2004 | Kallio et al. | 370/352 |
| 2006/0159251 A1 | 7/2006 | Guillard et al. | |
| 2007/0047709 A1 * | 3/2007 | Brunson et al. | 379/142.01 |
| 2008/0160991 A1 * | 7/2008 | Constantinof et al. | 455/426.2 |
| 2008/0198990 A1 * | 8/2008 | Noldus et al. | 379/142.04 |
| 2008/0267171 A1 * | 10/2008 | Buckley et al. | 370/352 |
| 2010/0202447 A1 | 8/2010 | Long et al. | |

FOREIGN PATENT DOCUMENTS

| | | |
|---|---|---|
| CN | 1153588 A | 7/1997 |
| CN | 1194082 A | 9/1998 |
| CN | 1859510 A | 11/2006 |
| CN | 1874379 A | 12/2006 |
| CN | 101420668 A | 4/2009 |

(Continued)

OTHER PUBLICATIONS

"Signalling System No. 7—ISDN User Part Signalling Procedures", ITU-T Recommendation Q.764, ITU, Dec. 1999, pp. cover, 79-81.*

(Continued)

*Primary Examiner* — Robert Wilson
*Assistant Examiner* — Ronald H Davis
(74) *Attorney, Agent, or Firm* — Slater & Matsil, LLP

(57) ABSTRACT

A call transfer method, system, and device are provided. The method includes obtaining information that the mobile switching center (MSC) of a called user equipment (UE) executes a call transfer service, and instructing the MSC of the called UE to send a call request to a third party UE according to the call originating process of the called UE.

13 Claims, 3 Drawing Sheets

FOREIGN PATENT DOCUMENTS

| JP | 2002-335583 A | 11/2002 |
|---|---|---|
| KR | 10-2005-0076531 A | 7/2005 |
| WO | WO 95/31076 A2 | 11/1995 |
| WO | WO 2006/037375 A1 | 4/2006 |
| WO | WO 2007/083979 A1 | 7/2007 |
| WO | WO 2007/101398 A1 | 9/2007 |

OTHER PUBLICATIONS

"Interworking between Session Initiation Protocol (SIP) and Bearer Independent Call Control protocol or ISDN User Part", ITU-T Recommendation Q.1912.5, ITU, Mar. 2004, pp. cover, 52-64 and 76-86.*

"3$^{rd}$ Generation Partnership Project; Technical Specification Group Services and System Aspects; Voice Call Continuity between CS and IMS Study (Release 7)," 3GPP TR 23.806 v7.0.0, Technical Report, XP 050363756, Dec. 2005, 154 pages, 3GPP Organizational Partners.

"3$^{rd}$ Generation Partnership Project; Technical Specification Group Core Network and Terminals; Voice Call Continuity between the Circuit-Switched (CS) domain and the IP Multimedia Core Network (CN) (IMS) subsystem; Stage 3 (Release 7)," 3GPP TS 24.206 v7.0.0, Technical Specification, XP 002489423, Nov. 2006, 114 pages, 3GPP Oganizational Partners.

"3$^{rd}$ Generation Partnership Project; Technical Specification Group Services and System Aspects; Combining Circuit Switched (CS) and IP Multimedia Subsystem (IMS) services; Stage 2 (Release 7)," 3GPP TS 23.279 v7.5.0, Technical Specification, XP 002452202, Dec. 2006, 36 pages, 3GPP Organizational Partners.

"3$^{rd}$ Generation Partnership Project; Technical Specification Group Services and System Aspects; IP Multimedia System (IMS) centralized services (Release 8)," 3GPP TR 23.892 v1.2.0, Technical Report, Sep. 2007, 120 pages, 3GPP Organizational Partners.

"3$^{rd}$ Generation Partnership Project; Technical Specification Group Services and System Aspects; Voice Call Continuity (VCC) between Circuit Switched (CS) and IP Multimedia Subsystem (IMS); Stage 2 (Release 7)," 3GPP TS 23.206 v7.4.0, Technical Specification, Sep. 2007, 36 pages, 3GPP Organizational Partners.

"Universal Mobile Telecommunications System (UMTS); Bearer-independent circuit-switched core network; Stage 2 (3GPP TS 23.205 version 5.15.0 Release 5)," ETSI TS 123 205 v5.15.0, Technical Specification, XP 014039878, Reference: RTS/TSGC-0423205v5f0, Oct. 2007, 224 pages, European Telecommunications Standards Institute.

Written Opinion of the International Searching Authority, International Application No. PCT/CN2008/072704, Applicant: Huawei Technologies Co., Ltd., et al., Date of mailing: Feb. 5, 2009, 6 pages.

Chinese Office Action, Chinese Application No. 200710165401.2, Date of mailng: Dec. 18, 2009, 15 pages.

Supplementary European Search Report, European Application No. 08853017.5-2412, International Application No. PCT/CN2008/072704, Applicant: Huawei Technologies Co., Ltd., 8 pages.

International Search Report, International application No. PCT/CN2008/072704, Date of mailing of the international search report Feb. 5, 2009, 4 pages.

Beijing University of Posts and Telecommunications, "VCC," 045673, Feb. 28, 2007, 77 pages. (English abstract located on p. 4).

European Search Report received in European Patent Application No. 08846040.7-1237, mailed Nov. 19, 2010, 7 pages.

Japanese Office Action and translation received in Japanese Patent Application No. 2010-530254, mailed Jun. 5, 2012, 11 pages.

Japanese Office Action and translation received in Japanese Patent Application No. 2010-530257, mailed Jun. 5, 2012, 8 pages.

International Search Report and translation received in Patent Cooperation Treaty Application No. PCT/CN2008/072812, mailed Feb. 5, 2009, 4 pages.

Written Opinion of the International Searching Authority and translation received in Patent Cooperation Treaty Application No. PCT/CN2008/072812, mailed Feb. 5, 2009, 7 pages.

* cited by examiner

CALL TRANSFER METHOD, SYSTEM AND DEVICE

This application is a continuation of co-pending International Application No. PCT/CN2008/072704, filed Oct. 15, 2008, which designated the United States and was not published in English, and which claims priority to Chinese Application No. 200710165401.2 filed Oct. 25, 2007, both of which applications are incorporated herein by reference.

TECHNICAL FIELD

The present invention relates to the mobile communication field, and in particular, to a call transfer method, system, and device.

BACKGROUND

At present, most mobile communication networks are circuit switched (CS) networks. Operators have built mature and rich service platforms based on CS networks. Among the service platforms, the mobile switching center (MSC) is responsible for call routing and service logic execution, for example, call transfer. With the continuous development of mobile technologies, a service network based on IP switching, namely, an IP multimedia subsystem (IMS), is emerging. Compared with the CS network, the IMS network provides higher bandwidth and supports more services. The core units of the IMS network are a serving-call session control function (S-CSCF) and various application servers (ASs). The S-CSCF is responsible for routing call requests to a proper AS when conditions are met. The AS is responsible for executing the service logic. The telephony application server (TAS), a kind of AS, controls the implementation of all supplementary services in the IMS network.

Being complex, the IMS network cannot be deployed within a short period of time. The CS network and IMS network will inevitably coexist within a certain period. To save construction costs, operators need to unify the service platforms of the CS network and IMS network and transfer the functions of the CS network to the IMS network. As a result, the IMS centralized services (ICS) emerge. In the ICS process, a user equipment (UE) sets up an IMS call through voice media over the CS network, the AS in the IMS network provides the call service. The CS bearer is implemented by setting up a CS call between the UE and a newly introduced IMS call control function (ICCF). In addition, the service processing logic in the MSC is weakened or removed. In this technology, the media gateway control function (MGCF) is required to convert the signaling and media between the CS network and the IMS network.

The voice call continuity (VCC) technology ensures the continuity of the voice calls transferred between the CS network and the IMS network. The core of this technology is a VCC AS. All calls or sessions must pass through the VCC AS in the IMS network. The VCC AS can act as a back-to-back user agent (B2BUA) for subsequent inter-domain transfer control.

The call transfer service is a supplementary service. A user who is set with the call transfer service may transfer a received call to a preset third party user. The call transfer services are classified into call deflection service and call forwarding service. In the prior art, the call transfer service between the CS network and the IMS network is implemented according to the method shown in FIG. 1. As shown in FIG. 1, a UE 2 in the IMS network originates a call to a VCC-enabled UE 1 in the CS network, and the UE 1 triggers the call transfer service to transfer to the call to the UE 3. The S-CSCF, VCC AS, and TAS shown in FIG. 1 reside in the home network of the UE 1. FIG. 1 shows the process of transferring a call according to the prior art. The process includes the following steps.

Step 101: The UE 2 sends a call request to the UE 1.

In this step, the UE 2 sends a call request to the UE 1 through the TAS, S-CSCF, call transfer server, MGCF, and MSC of the UE 1.

Step 102: The UE 1 triggers the call transfer service.

In this step, the call transfer service triggered by the UE 1 can be the call deflection (CD) service (for example, the UE 1 enters the number of the UE 3), call forwarding service (for example, the call is forwarded when the UE 1 is busy), or any other call transfer mode.

Step 103: After obtaining the information that the UE 1 triggers the call transfer service, the MSC of the UE 1 obtains the call transfer information set by the UE 1 and sends a request for redirecting to the IMS network to the call transfer server. The service request can contain the third party information, namely, the number of the UE 3.

Step 104: After receiving the redirection request, the call transfer server allocates an IP multimedia routing number (IMRN) to the call and sends the IMRN to the MSC of the UE 1.

The IMRN number is used to route the calls from the CS network to the call transfer server in the IMS network.

Step 105: The MSC of the UE 1 uses the IMRN as the called number and sends a call request to the MGCF by using the IAM command.

Step 106: The MGCF converts the CS signaling into a Session Initiation Protocol (SIP) Invite message and sends the call request to the S-CSCF through the Invite message. The Invite message carries the called number, namely, IMRN.

Step 107: The S-CSCF routes the call request to the call transfer server according to the initial filter criteria (iFC).

Step 108: After receiving the Invite message, the call transfer server sends a call request to the S-CSCF by generating a new Invite message according to the number of the UE 3 obtained in step 103.

Step 109: The S-CSCF routes the received call request to the TAS according to the iFC.

Step 110: The TAS, acting as a B2BUA, sends a call request to the S-CSCF by generating a new Invite message.

Step 111: The S-CSCF routes the received call request to the UE 3.

Step 112: The UE 3 returns an ACK message (200 OK) to the UE 2. The ACK message is returned according to the call request signaling; that is, the responses to all call requests are returned according to the signaling paths of the call requests.

As shown in FIG. 1, after step 103 is performed, the call transfer server allocates an IMRN to the call request from the MSC of the called UE, and the call request still needs to be routed to the call transfer server according to the IMRN. The call transfer server sends a call request to the S-CSCF according to the obtained number of the UE 3, and the S-CSCF routes the call request to the TAS, and then the TAS acting as the B2BUA sends the call request to the UE 3 through the S-CSCF. That is, in the call process after the UE 1 triggers the call transfer service, the call request still needs to be routed to the call transfer server, thus inevitably causing redundant call request signaling and a waste of network resources.

SUMMARY OF THE INVENTION

Embodiments of the present invention provide a call transfer method, system, and device to reduce the waste of network resources resulting from call request redundancy in the subsequent process after the called user triggers the call transfer service.

A call transfer method includes obtaining information that an MSC of a called UE executes a call transfer service, and instructing the MSC of the called UE to send a call request to a third party UE according to a call originating process of the called UE.

A call transfer system includes a call transfer server, configured to obtain information that an MSC of a called UE executes a call transfer service, and instruct the MSC of the called UE to send a call request to a third party UE according to a call originating process of the called UE; and the MSC of the called UE, configured to trigger the call transfer service and receive the instruction from the call transfer server.

A call transfer server includes a call transfer information obtaining unit, configured to obtain information that an MSC of a called UE executes a call transfer service; and an instruction sending unit, configured to instruct the MSC of the called UE to send a call request to a third party UE according to a call originating process of the called UE after obtaining the information that the MSC of the called UE executes the call transfer service.

According to the above technical solution, in the method, system and device provided in embodiments of the present invention, after the information that the MSC of the called UE executes the call transfer service is obtained, the MSC of the called UE is instructed to send a call request to the third party UE according to the call originating process of the called UE. In this way, after the called UE triggers the call transfer service, the MSC of the called UE can directly send a call request to the third party UE according to the call originating process of the called UE, instead of through the call transfer server, S-CSCF, and TAS, thus reducing the call request signaling and saving the network resources.

DETAILED DESCRIPTION OF ILLUSTRATIVE EMBODIMENTS

The present invention is described as follows in detail by reference to embodiments and accompanying drawings.

A call transfer method provided in an embodiment of the present invention includes obtaining information that the MSC of a called UE executes a call transfer service, and instructing the MSC of the called UE to send a call request to a third party UE according to the call originating process of the called UE.

The operations in the foregoing method can be performed by a call transfer server. The call transfer server may be a VCC AS, an ICCF, or any other server that implements centralized control over the call services in the CS and IMS networks, or any server that ensures the continuity of the calls between the CS and IMS networks.

The method for the call transfer server to obtain call transfer information includes, but not limited to the following modes:

a. After obtaining the information that the called UE triggers the call transfer service, the MSC of the called UE sends a request for redirecting to the IMS network to the call transfer server. The call transfer server obtains the information that the MSC of the called UE executes the call transfer service according to the request for redirecting to the IMS network.

b. The MSC of the called UE may send a call request to the call transfer server after obtaining the information that the called UE triggers the call transfer service. The call transfer server determines whether it sent a call request to the MSC of the called UE previously; if so, the call transfer server determines that the current call is a call transfer service.

c. After obtaining the information that the called UE triggers the call transfer service, the MSC of the called UE may send a call transfer indication message to the call transfer server, for example, setting a specific parameter to carry the call transfer information in the message, so that the call transfer server can know that the current call is a call transfer service.

Figure 1:
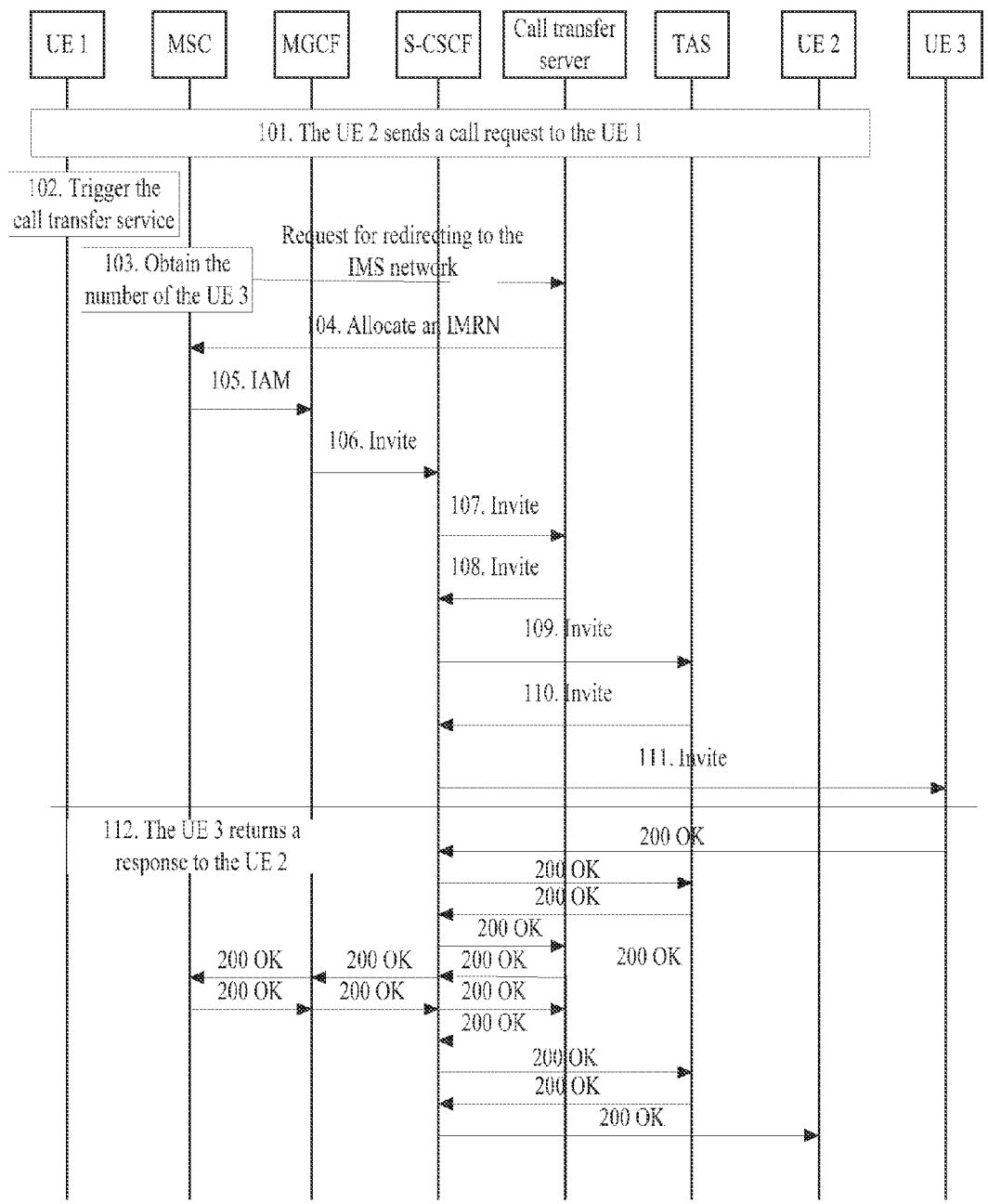
FIG. 1 is a flowchart of a call transfer method in the prior art.
Figure 2:
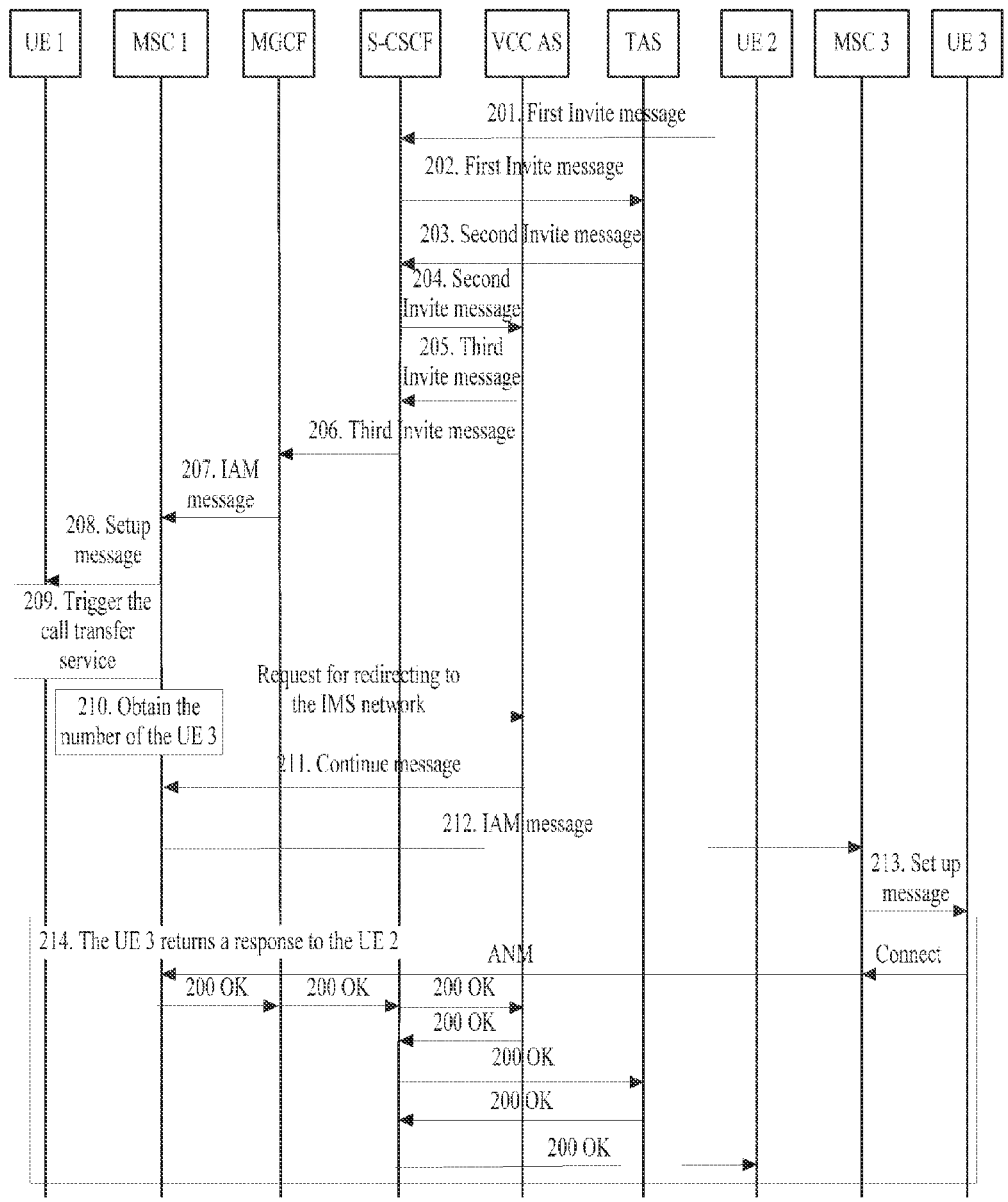
FIG. 2 is a flowchart of a call transfer method provided in an embodiment of the present invention.

FIG. 2 is a flowchart of a call transfer method provided in an embodiment of the present invention. In this embodiment of the prevent invention, the UE 2 is the UE of the calling party and resides in the IMS network; the UE 1 is the UE of the called party and resides in the CS network, and the UE 1 is configured with the call transfer function and can forward the incoming calls to the UE of the third party, UE 3. The MSC 1 is the home MSC of the UE 1, and the MSC 3 is the home MSC of the UE 3. As shown in FIG. 2, the method may include the following steps.

Step 201: The UE 2 sends a call request to the S-CSCF through a first Invite message that carries the number of the UE 1.

Step 202: The S-CSCF routes the first Invite message to the TAS according to the iFC.

Step 203: The TAS, acting as a B2BUA, terminates the call request sent through the first Invite message, generates a second Invite message, and sends a call request to the S-CSCF through the second Invite message.

Step 204: The S-CSCF routes the second Invite message to the VCC AS.

Step 205: The VCC AS allocates a circuit switched domain routing number (CSRN) to the UE 1 in the CS network, and acts as a B2BUA to terminate the second Invite message and generate a third Invite message carrying the CSRN, and sends a call request to the S-CSCF through the third Invite message.

The VCC AS is a call transfer server for the VCC service. When other services are triggered, other call transfer servers can be used. For example, the ICCF can be used for the ICS service.

Step 206: The S-CSCF routes the call request sent through the third Invite message to the MGCF.

Step 207: The MGCF converts the third Invite message into an initial address message (IAM) of the CS domain, and sends a call request to the MSC 1 through the IAM message.

Step 208: The MSC 1 converts the received IAM message into a Setup message and sends the call request to the UE 1 through the Setup message.

Step 209: After receiving the call request, the UE 1 triggers the call transfer service.

In this step, if the UE 1 triggers the call deflection service, the UE 1 enters the number of the UE 3 and sends it to the MSC 1 through a Disconnect message. After receiving the Disconnect message, the MSC 1 sends a Release message to the UE 1. After receiving the Release message, the UE 1 returns a Release Complete message to the MSC 1 and disconnects the signaling connection for the call request between UE 1 and MSC 1. If the UE 1 triggers the call forwarding service, for example, the call forwarding busy (CFU) service, it can return a User Determined User Busy (UDUB) message to the MSC 1, indicating that the UE 1 is busy.

Step 210: After knowing that the UE 1 triggers the call transfer service, the MSC 1 starts to execute the call transfer service, obtains the third party UE information set by the UE 2, namely, the number of the UE 3, and sends a request for redirecting to the IMS network to the VCC AS. The request for redirecting to the IMS network can be sent through an Initial Detection Point (IDP) message.

In this step, if the UE 1 triggers the call deflection service, the MSC 1 may obtain this information and the number of the UE 3 from the Disconnect message sent by the UE 1. If the UE 1 triggers the CFU service, the MSC 1 can obtain this information from the UDUB message sent by the UE 1, the subscription information of the UE 1 from the VLR, and the third party information, namely, the number of the UE 3, when the UE 1 is busy from the subscription information.

Steps 201 to 210 are available in the prior art.

Step 211: After receiving the request for redirecting to the IMS network, the VCC AS sends a Continue message to the MSC 1 to reject the request.

In this embodiment, the information that the called UE triggers the call transfer service is obtained through a request for redirecting to the IMS network. The request may be an IMRN request. Certainly, the information that the called UE triggers the call transfer service may also be obtained through other methods. For example, specific parameters may be set in an IDP message, and a GSM service control function (gsmSCF) unit in the VCC AS may know that the call is a call transfer service and that the third party user information is the number of the UE 3 from the specific parameters of the IDP message.

The Continue message is used to instruct the MSC 1 to perform the subsequent operations according to the process of the UE 1 originating a call to the UE 3. In addition to the Continue message, other messages can be used to instruct the MSC 1 to perform subsequent operations according to the process of the UE 1 originating a call to the UE 3. For example, the Continue message that carries parameters or the Connect message that carries the number of the UE 3 can be used.

Step 212: The MSC 1 sends a call request to the MSC 3 through the IAM message.

If the UE 3 is a UE in the CS network, the MSC 1 directly sends the IAM message to the MSC 3. If the UE 3 is a UE in the IMS network, the MSC 1 sends the IAM message to the MGCF, and the MGCF coverts the IAM message into an Invite message and sends the Invite message to the UE3.

Step 213: The MSC 3 converts the received IAM message into a Setup message and sends the call request to the UE 3 through the Setup message.

Step 214: The UE 3 returns an ACK message to the UE 2.

The UE 3 returns an ACK message to the UE 2 according to the signaling path of the call request. Therefore, the ACK message can reflect the resource usage of the call request signaling. As seen from the ACK message returned in step 214, this process greatly reduces the call signaling redundancy and saves the network resources.

Figure 3:
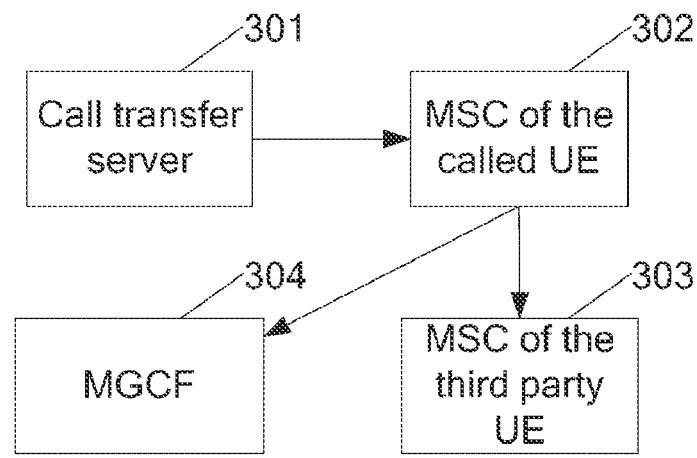
FIG. 3 shows a structure of a call transfer system provided in an embodiment of the present invention.

FIG. 3 shows a structure of a call transfer system provided in an embodiment of the present invention. The system shown in FIG. 3 may include a call transfer server 301 and an MSC 302 of a called UE.

The call transfer server 301 is configured to instruct the MSC 302 of the called UE to send a call request to a third party UE according to the call originating process of the called UE after obtaining information that the MSC of the called UE executes the call transfer service.

The MSC 302 of the called UE is configured to execute the call transfer service and receive the instruction from the call transfer server 301.

The call transfer server 301 may be a VCC AS, an ICCF, any other server that implements centralized call control between the CS and IMS networks, or any other server that ensures the continuity of the calls between the CS and IMS networks.

The system may further include an MSC 303 of the third party UE.

The MSC 302 of the called UE may be further configured to send a call request to the MSC 303 of the third party UE through an IAM message after receiving the instruction.

The MSC 303 of the third party UE may be further configured to convert the IAM message into a Setup message and send a call request to the third party UE through the Setup message.

The MSC 302 of the called UE may be further configured to send a call request to the MGCF through an IAM message after receiving the instruction from the call transfer server 301.

In this case, the system may further include an MGCF 304, which is configured to convert the received IAM message into an Invite message and send a call request to the third party UE through the Invite message.

Figure 4:
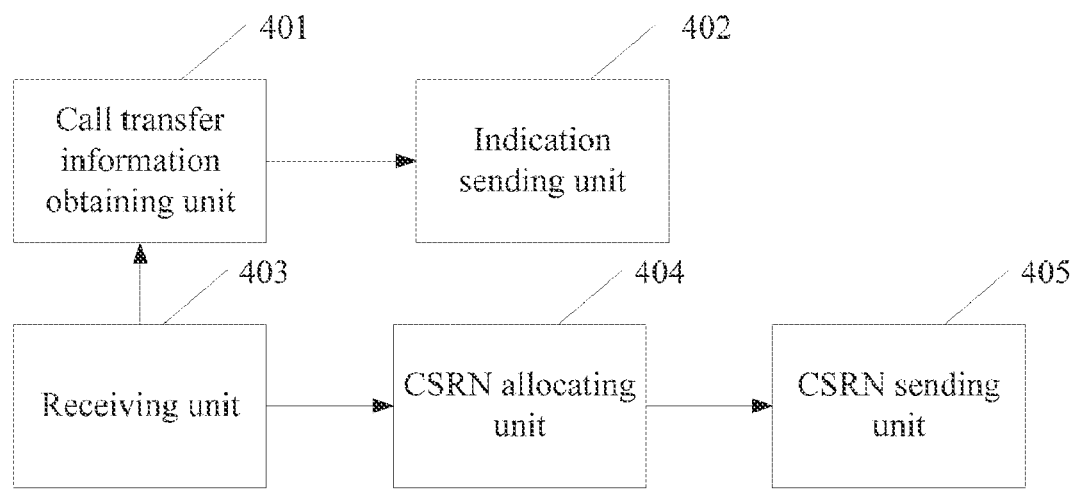
FIG. 4 shows a structure of a call transfer server provided in an embodiment of the present invention.

FIG. 4 shows a structure of a call transfer server according to an embodiment of the present invention. The call transfer server shown in FIG. 4 may include a call transfer information obtaining unit 401 and an indication sending unit 402.

The call transfer information obtaining unit 401 is configured to obtain information that the MSC of a called UE executes the call transfer service.

The instruction sending unit 402 is configured to instruct the MSC of the called UE to send a call request to a third party UE according to the call originating process of the called UE after obtaining the information that the called UE triggers the call transfer service.

The call transfer server may further include a receiving unit 403, a CSRN allocating unit 404, and a CSRN sending unit 405.

The receiving unit 403 is configured to receive a call request sent through an Invite message.

The CSRN allocating unit 404 is configured to allocate a CSRN for the call request when the destination address of the Invite message received by the receiving unit 403 is the called UE in the CS network.

The CSRN sending unit 405 is configured to send the allocated CSRN.

The receiving unit 403, CSRN allocating unit 404, and CSRN sending unit 405 may be configured to transfer the call to the CS network by allocating the CSRN for the call request in the process when the calling UE sends a call request to the called UE.

The call transfer information obtaining unit 401 is configured to obtain the call transfer information from the IDP message sent from the receiving unit 403. The IDP message may carry the IMRN, call request, or special parameter that indicates the call is a call transfer service.

As seen from the foregoing descriptions, in the call transfer method, system, and device provided in embodiments of the present invention, after the information that the MSC of the called UE executes the call transfer service is obtained, the MSC of the called UE is instructed to send a call request to the third party UE according to the call originating process of the called UE.

In this way, after the called UE triggers the call transfer service, the MSC of the called UE can directly send a call request to the third party UE according to the call originating process of the called UE, instead of through the call transfer server, S-CSCF, and TAS, thus reducing the call request signaling and saving the network resources.

Although the present invention has been described through some exemplary embodiments, the invention is not limited to such embodiments. It is apparent that those skilled in the art can make various modifications and variations to the invention without departing from the scope of the invention. The invention is intended to cover the modifications and variations provided that they fall in the protection scope defined by the following claims or their equivalents.

What is claimed is:

1. A call transfer method for a call transfer service between a circuit switched (CS) network and an IP multimedia subsystem (IMS) network, the method comprising:
   determining by a call transfer server that a mobile switching center (MSC) of a called user equipment (UE) performs a call transfer, the call transfer server being a server that implements centralized control over the call services in the CS and IMS networks, or a server that ensures the continuity of the calls between the CS and IMS networks; and
   instructing by the call transfer server the MSC of the called UE to directly send a call request to a third party UE according to a call originating process of the called UE.

2. The method of claim 1, wherein determining by the call transfer server that the MSC of the called UE performs the call transfer comprises obtaining information through a service request for redirecting to the IMS network from the MSC of the called UE.

3. The method of claim 1, wherein determining by the call transfer server that the MSC of the called UE performs the call transfer comprises obtaining information by receiving a call request sent by the MSC of the called UE after a call request destined for the called UE is sent to the MSC of the called UE.

4. The method of claim 1, wherein determining by the call transfer server that the MSC of the called UE performs the call transfer comprises obtaining information through a call transfer indication message sent by the MSC of the called UE.

5. The method of claim 1, wherein instructing by the call transfer server the MSC of the called UE to directly send the call request to the third party UE according to the call originating process of the called UE comprises sending a Continue message to the MSC of the called UE.

6. The method of claim 1, wherein instructing by the call transfer server the MSC of the called UE to directly send the call request to the third party UE according to the call originating process of the called UE comprises sending a Connect message carrying third party UE information.

7. The method of claim 1, further comprising:
   sending, by the MSC of the called UE, a call request to an MSC of the third party UE through an initial address message (IAM) according to an instruction; and
   converting, by the MSC of the third party UE, the IAM message into a Setup message and sending the call request to the third party UE through the Setup message.

8. The method of claim 5, further comprising:
   sending, by the MSC of the called UE, a call request to a media gateway control function (MGCF) through an initial address message (IAM) after receiving the Continue message; and
   converting, by the MGCF, the IAM message into an Invite message and sending the call request to the third party UE through the Invite message.

9. A call transfer system for the call transfer service between a circuit switched (CS) network and an IP multimedia subsystem (IMS) network, the system comprising:
   a call transfer server configured to determine that a mobile switching center (MSC) of a called user equipment (UE) performs a call transfer and instructs the MSC of the called UE to directly send a call request to a third party UE according to a call originating process of the called UE, the call transfer server being a server that implements centralized control over the call services in the CS and IMS networks, or a server that ensures the continuity of the calls between the CS and IMS networks; and
   the MSC of the called UE, configured to perform the call transfer and receive an instruction from the call transfer server.

10. The system of claim 9, wherein:
    the MSC of the called UE is further configured to send a call request to an MSC of the third party UE through an initial address message (IAM) after receiving the instruction; and
    the MSC of the third party UE is configured to convert the IAM message into a Setup message and send the call request to the third party UE through the Setup message.

11. The system of claim 9, wherein:
    the MSC of the called UE is configured to send a call request to a media gateway control function (MGCF) through an initial address message (IAM) after receiving the instruction; and
    the MGCF is configured to convert the IAM message into an Invite message and send the call request to the third party UE through the Invite message.

12. A call transfer server for the call transfer service between a circuit switched (CS) network and an IP multimedia subsystem (IMS) network, the server comprising:
    a call transfer information obtaining unit configured to determine that a mobile switching center (MSC) of a called user equipment (UE) performs a call transfer; and
    an instruction sending unit configured to instruct the MSC of the called UE to directly send a call request to a third party UE according to a call originating process of the called UE after determining that the MSC of the called UE performs the call transfer;
    wherein the call transfer server is a server that implements centralized control over the call services in the CS and IMS networks or a server that ensures the continuity of the calls between the CS and IMS networks.

13. The call transfer server of claim 12, further comprising:
    a receiving unit configured to receive the call request sent through an Invite message;
    a CSRN allocating unit configured to allocate a circuit switched domain routing number (CSRN) for the call request when a destination address of the Invite message received by the receiving unit is the called UE in a CS network; and
    a CSRN sending unit configured to send the allocated CSRN.

* * * * *